April 22, 1930.  M. ROMAN  1,755,335
MILK CONTAINER HOLDER
Filed Feb. 2, 1929
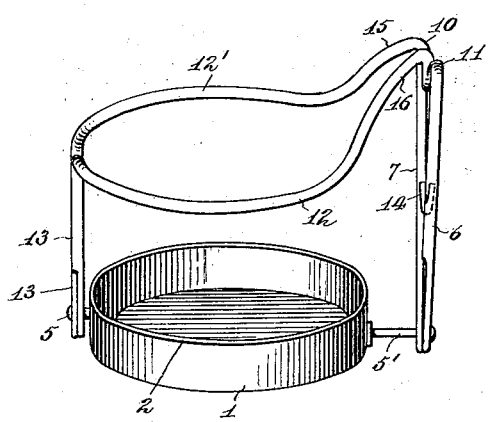
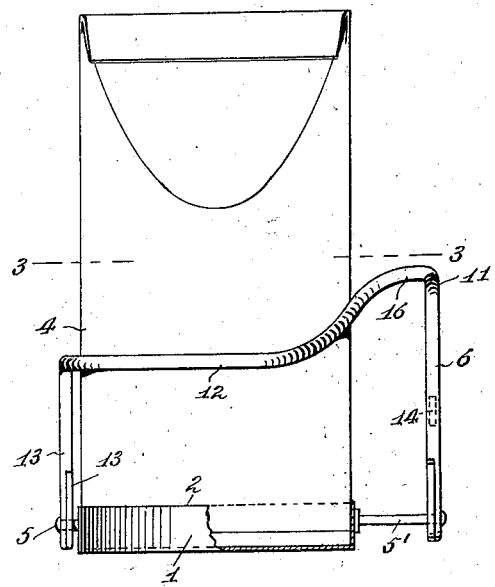
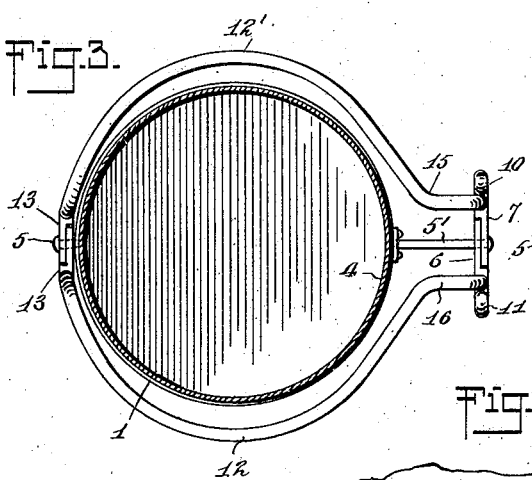
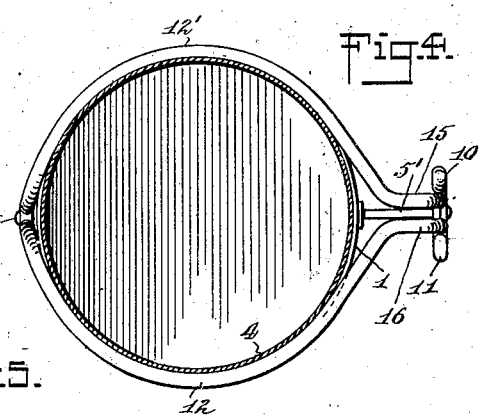
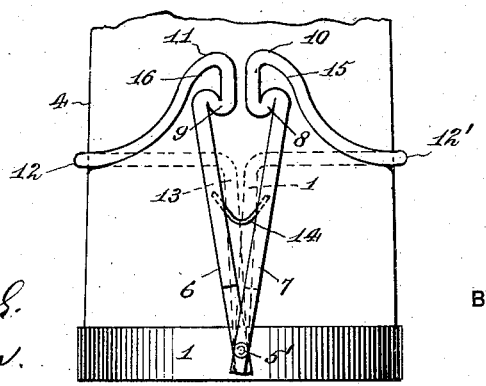
WITNESSES
INVENTOR
Max Roman
BY
ATTORNEY Patented Apr. 22, 1930

1,755,335

UNITED STATES PATENT OFFICE

MAX ROMAN, OF NEW YORK, N. Y.

MILK-CONTAINER HOLDER

Application filed February 2, 1929. Serial No. 336,962.

This invention relates to a holder for containers, and particularly to an improved holder for milk containers, the object being to provide a construction which may readily receive a container and which will automatically grasp the container each time the holder is grasped.

Another object of the invention, more specifically, is to provide a holder for tapering paper milk bottles, the structure being such that when the handles of the holder are grasped part of the holder will be constricted for gripping the container and holding the same against independent movement while being tilted or carried.

An additional object is to provide a holder for milk bottles and the like wherein an encircling gripping band is provided, the same being associated with swinging or resilient handles, so that when the handles are grasped and brought toward each other the band will be constricted so as to grip the bottle or other article in order to prevent any displacement thereof.

In the accompanying drawings,—

Figure 1 is a perspective view of a holder disclosing an embodiment of the invention;

Figure 2 is a side view of the holder shown in Figure 1 but showing a paper milk bottle positioned in a container;

Figure 3 is a sectional view through Figure 2 on the line 3—3;

Figure 4 is a view similar to Figure 3 with the handles and associated parts moved to a clamping position;

Figure 5 is a side view of the holder taken at a right angle to Figure 2.

Referring to the accompanying drawings by numerals, 1 indicates the base of the holder which is formed preferably from metal and is provided with a side wall 2 and a bottom 3. This base is adapted to receive the lower end of the container 4 which is shown as a tapering paper milk container. Containers of this kind are now in commercial use and are formed of what is commonly known as waxed or paraffined paper. When cold milk is placed in one of these containers it is difficult to grasp the container as it tapers from the top to the bottom and is very liable to slip. In order to provide means whereby the container may be manipulated, the holder shown in Figure 1 has been provided. Connected with the side walls 2 of the base 1 are journal pins 5 and 5'. Pivotally connected to the outer end of pin 5' are handles 6 and 7. These handles extend upwardly inclined from each other, as shown in Figure 5, and are bent at 8 and 9 and again at 10 and 11 for forming the ring sections 12 and 12'. These ring sections merge into integral depending bars 13 which are pivotally mounted at their lower ends on pin 5. It will be noted that pins 5 and 5' are in alignment, whereby the ring section 12, one of the bars 13 and handle 6 are formed of one piece and swing together. The same is true of ring section 12' and associated parts. Normally these parts are held spaced by a sutiable spring 14 but the action of this spring is overcome when the handles 6 and 7 are grasped. As shown particularly in Figure 1, the base 1 presents a cup or socket and normally the sections 12 and 12' form part of a circle greater in diameter than at the base. This will permit the bottle or container 4 to be readily inserted from above and when inserted, as shown in Figure 2, may be grasped by the ring sections 12 and 12', so that it will be held firmly. From Figure 2 it will be noted that the handle or handle members 6 and 7 are spaced from base 1. This arrangement is provided in order that an ample space may be provided between the handles and the container 4 so as to permit the handles to be readily grasped by the fingers of a person. When the handles are grasped and the parts lifted the handles automatically move toward each other from the position shown in Figure 3 to substantially the position shown in Figure 4. This swinging movement of the handles, ring sections and associated parts will cause a proper gripping action of the container an appreciable distance above the base, so that the container may be transported or may be inverted as desired to discharge the container thereof. This action will take place if the walls of the container are parallel, though the walls of most paper containers are tapering, but the swinging action of the various parts will take care of this condition. The holder is particularly adapted for home use, though it may be used in any place and under substantially any condition, the structure being such that the bottle is properly held at all times and preferably is left in the holder until empty. It will be noted from Figure 4 that through the extensions 15 and 16 the spacing of the handles may be readily done, as above-mentioned and the parts easily swung to or from a gripping position.

What I claim is:—

1. A milk bottle container holder, comprising a base, a pair of clamping ring sections, and means for pivotally connecting the ring sections with the base, part of said means acting as handle members for manipulating the ring sections for lifting the holder when the same is transported.

2. A holder for tapering paper milk bottles, comprising a base adapted to receive the bottom portion of the milk bottle, guiding and clamping ring sections pivotally connected to but spaced from said base, and a handle pivotally connected with the base for the holder acting in the double capacity of a handle and means for constricting the diameter of said ring sections so that the ring sections will grip said bottle at a point above the base.

3. A tapering milk bottle holder, comprising a cup-shaped base for receiving the bottom part of the milk bottle, a pair of clamping ring sections spaced above the base and positioned to normally loosely surround the milk bottle, and manually-actuated means connected with said base and operatively associated with said ring sections for constricting the effective diameter thereof to cause the same to grip a milk bottle at a point spaced above the base.

4. A holder for paper milk bottles, comprising a cup-shaped base, a pair of arms pivotally connected at their lower ends to the base, a clamping ring section rigidly connected with the end of said arms and adapted to surround a milk bottle carried by said base, bars at the diametrically opposite sides to said arms, said bars connecting the respective ring sections pivotally with the base, and resilient means for normally holding said arms apart, said arms being adapted to be grasped and forced together for causing said ring sections to grip said milk bottle when the device is in use.

MAX ROMAN.